(12) United States Patent
Jakes et al.

(10) Patent No.: US 12,408,094 B2
(45) Date of Patent: Sep. 2, 2025

(54) SYSTEMS AND METHODS FOR SELECTIVELY SWITCHING BETWEEN PRIMARY DATA CONNECTION MODES OF A MOBILE DEVICE

(71) Applicant: Lenovo (Beijing) Ltd., Beijing (CN)

(72) Inventors: Philip J. Jakes, Raleigh, NC (US); Kenneth Seethaler, Raleigh, NC (US); Tin-Lup Wong, Chapel Hill, NC (US); David Douglas, Cary, NC (US); Koji Kawakita, Yokohama (JP); Kazuo Fujii, Tokyo (JP)

(73) Assignee: Lenovo (Beijing) Ltd., Beijing (CN)

( * ) Notice: Subject to any disclaimer, the term of this patent is extended or adjusted under 35 U.S.C. 154(b) by 477 days.

(21) Appl. No.: 17/940,050

(22) Filed: Sep. 8, 2022

(65) Prior Publication Data
US 2023/0413143 A1 Dec. 21, 2023

(51) Int. Cl.
*H04W 36/14* (2009.01)
*H04W 36/32* (2009.01)
*H04W 36/38* (2009.01)
*H04W 84/10* (2009.01)

(52) U.S. Cl.
CPC ......... *H04W 36/324* (2023.05); *H04W 36/14* (2013.01); *H04W 36/32* (2013.01); *H04W 36/38* (2013.01); *H04W 36/1446* (2023.05); *H04W 84/10* (2013.01)

(58) Field of Classification Search
CPC ............... H04W 36/324; H04W 36/38; H04W 36/1446; H04W 84/10; H04W 84/12; H04W 36/14; H04W 36/32; H04W 36/008375; H04W 52/0235; G01S 11/06
See application file for complete search history.

(56) References Cited

U.S. PATENT DOCUMENTS

| | | | |
|---|---|---|---|
| 9,648,538 B2* | 5/2017 | Ganesan | H04W 52/0235 |
| 2007/0165583 A1* | 7/2007 | Pecen | H04W 36/008375 |
| | | | 370/338 |
| 2014/0139663 A1* | 5/2014 | Watanabe | G01S 11/06 |
| | | | 348/143 |
| 2015/0304929 A1* | 10/2015 | Hua | H04W 36/324 |
| | | | 455/436 |

* cited by examiner

*Primary Examiner* — Vinncelas Louis
(74) *Attorney, Agent, or Firm* — Dean D. Small; The Small Patent Law Group, LLC

(57) ABSTRACT

A system and a method for automatically switching between a WLAN primary data connection mode and a WWAN primary data connection mode within a mobile device include a switching control unit in communication with a WLAN communication device and a WWAN communication device. The switching control unit is configured to selectively and automatically switch the mobile device between the WLAN primary data connection mode and the WWAN primary data connection mode based on one or both of motion of the mobile device or a time period of the motion of the mobile device.

20 Claims, 2 Drawing Sheets

SYSTEMS AND METHODS FOR SELECTIVELY SWITCHING BETWEEN PRIMARY DATA CONNECTION MODES OF A MOBILE DEVICE

CROSS REFERENCE TO RELATED APPLICATIONS

This application claims benefit to Chinese Application No. 202210531292.6, filed 17 May 2022, the subject matter of which is herein incorporated by reference in its entirety.

BACKGROUND

Embodiments of the present disclosure generally relate to systems and methods for selectively switching between primary data connection modes, such as a wireless local area network (WLAN) primary data connection mode, for example, Wi-Fi, and a wireless wide area network (WWAN) primary data connection mode, for example, cellular, of a mobile device.

Individuals use mobile devices for a variety of purposes. For example, mobile devices such a smart phones, smart tablets, smart watches, and laptop computers can be used to communicate through video conferencing, cellular communications, and the like. As another example, mobile devices allow individuals to communicate through electronic mail. As another example, mobile devices allow individuals to access information through the Internet.

While moving in urban or densely populated spaces, a mobile device typically encounters numerous known Wi-Fi networks, such as those previously saved (for example, a favorite coffee shop, school, or neighbor's residence), but also from aggregated roaming networks of commercial entities. Wi-Fi devices can automatically connect to such networks temporarily while traveling near the network, then very quickly go out of range and then reconnect to a different network. Each handoff between different networks introduces a lag or reconnection delay which can potentially disrupt a streaming or conferencing application.

Typically, mobile devices connect to a Wi-Fi network based only on signal strength and the desire to use Wi-Fi to offload congested cellular networks. Avoiding such automatic connection usually requires an individual to manually disable Wi-Fi when traveling through areas having Wi-Fi networks.

SUMMARY

A need exists for a system and a method for consistent and reliable communication via a mobile device. Further, a need exists for a system and a method for providing consistent and reliable communication via a mobile device as an individual moves.

With those needs in mind, certain examples of the present disclosure provide a system for automatically switching between a WLAN (such as Wi-Fi) primary data connection mode and a WWAN (such as cellular) primary data connection mode within a mobile device. The system includes a switching control unit in communication with a WLAN (for example, Wi-Fi) communication device and a WWAN (for example, cellular) communication device. The switching control unit is configured to selectively and automatically switch the mobile device between the WLAN primary data connection mode and the WWAN primary data connection mode based on one or both of motion of the mobile device or a time period of the motion of the mobile device.

In at least one example, the switching control unit is configured to selectively and automatically switch the mobile device between the WLAN primary data connection mode and the WWAN primary data connection mode based on the motion of the mobile device and the time period of the motion of the mobile device.

The mobile device can be a smart phone, a smart tablet, a smart watch, or a laptop computer.

In at least one example, the system includes a housing that retains the WLAN communication device, the WWAN communication device, and the switching control unit.

In at least one example, the system includes a motion detector in communication with the switching control unit. The motion detector is configured to detect the motion of the mobile device.

In at least one example, the system includes a timing device in communication with the switching control unit. The timing device is configured to detect the time period of the motion of the mobile device.

In at least one example, the switching control unit is configured to automatically switch the mobile device from the WLAN primary data connection mode to the WWAN primary data connection mode in response to the motion exceeding one or more predetermined motion thresholds for the time period exceeding one or more predetermined time thresholds.

In at least one example, the switching control unit is configured to deactivate the WLAN communication device when the mobile device is in the WWAN primary data connection mode. In at least one other example, the switching control unit is configured to allow the WLAN communication device to remain active when the mobile device is in the WWAN primary data connection mode.

Certain examples of the present disclosure provide a method for automatically switching between a WLAN primary data connection mode and a WWAN primary data connection mode within a mobile device. The method includes selectively and automatically switching, by a switching control unit in communication with a WLAN communication device and a WWAN communication device, the mobile device between the WLAN primary data connection mode and the WWAN primary data connection mode based on one or both of motion of the mobile device or a time period of the motion of the mobile device.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment," "in an embodiment" or the like in various places throughout this specification are not necessarily all referring to the same embodiment.

Furthermore, the described features, structures or characteristics may be combined in any suitable manner in one or more embodiments. In the following description, numerous specific details are provided to give a thorough understanding of the various embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

An individual having a mobile device may travel through various ways, such as by walking or running, riding a bike or scooter, traveling within a car, bus, or train, or the like. Embodiments of the present disclosure provide systems and methods of consistent and reliable communication via a mobile device in each of these cases. For example, as a mobile device moves through various Wi-Fi networks, the systems and methods provide consistent and reliable communication during movement and periodic stops, such as for stoplights, traffic congestion, and/or scheduled transit stops.

Embodiments of the present disclosure provide systems and methods that include a mobile device having one or more detectors or sensors that provide additional intelligence to a decision to change networks. Motion can be detected through one or more motion detectors, such as global positioning system (GPS) components, accelerometers, gyroscopes, or the like. In at least one example, when motion is detected for a time length over a threshold, roaming is disabled for a set period of time or until the movement is determined to have ended for a predetermined period of time.

Figure 1:
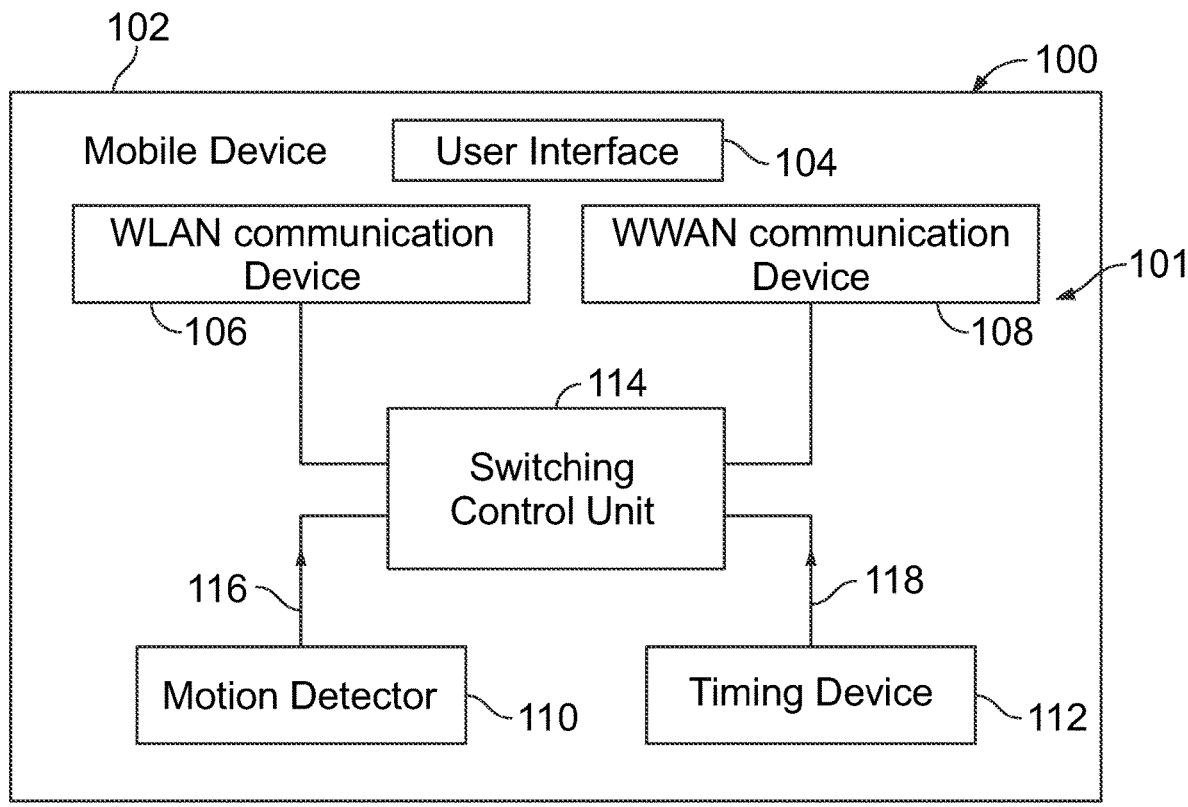
FIG. 1 illustrates a schematic block diagram of a mobile device configured to automatically switch between different primary data connection modes, according to an example of the present disclosure.

FIG. 1 illustrates a schematic block diagram of a mobile device 100 configured to automatically (that is, without human intervention) switch between different primary data connection modes, according to an example of the present disclosure. A system 101 having the mobile device 100 is configured to automatically switch between the different primary data connection modes. In at least one example, the system 101 is for automatically switching between a wireless local area network (WLAN) primary data connection mode and a wireless wide area network (WWAN) primary data connection mode within the mobile device 100. For example, the WLAN primary data connection mode can be a Wi-Fi primary data connection mode, and the WWAN primary data connection mode can be a cellular primary data connection mode.

In at least one example, the mobile device 100 is a smart phone, smart tablet, smart watch, laptop computer, or the like. The mobile device 100 includes a housing 102 that retains a user interface 104, such as can include a display, a user input device, and/or the like. The display can be an electronic screen. The user input device can include one or more keys or the like that allow an individual to input information. In at least one example, the display and the user input device are integrated into a common component, such as a touchscreen interface.

The housing 102 also retains a WLAN communication device 106, such as a wireless Wi-Fi transceiver, antenna, and/or the like. The WLAN communication device 106 allows the mobile device 100 to communicate in a W-Fi primary data connection mode with one or more Wi-Fi networks. The WLAN communication device 106 is retained on and/or within the housing 102.

The housing 102 also retains a WWAN communication device 108, such as a wireless cellular transceiver, antenna, and/or the like. The WWAN communication device 108 allows the mobile device 100 to communicate in a WWAN primary data connection mode with one or more cellular networks. The WWAN communication device 108 is retained on and/or within the housing 102.

The housing 102 also retains a motion detector 110, such as can include one or more of an accelerometer, a gyroscope, a GPS device, and/or the like. The motion detector 110 is configured to detect motion of the mobile device 100, such as a speed at which the mobile device 100 is traveling. The motion detector 110 is retained on and/or within the housing 102.

The housing 102 also retains a timing device 112, such as a clock, timer, electronic stop watch, and/or the like. The timing device 112 is configured to detect and measure time periods, such as a time period (that is, a length of time) of motion of the mobile device 100. The timing device 112 is retained on and/or within the housing 102.

A switching control unit 114 is also retained by the housing 102. The switching control unit 114 is in communication with the WLAN communication device 106, the WWAN communication device 108, the motion detector 110, and the timing device 112, such as through one or more wired or wireless connections. The switching control unit 114 is configured to automatically and selectively switch between different primary data connection modes, such as the WLAN primary data connection mode via the WLAN communication device 106, and the WWAN primary data connection mode via the WWAN communication device 108, based on motion detected by motion detector 110.

In operation, when the mobile device 100 is within the range of an accepted Wi-Fi network, the mobile device 100 communicates in the WLAN primary data connection mode via the WLAN communication device 106. The motion detector 110 senses any motion of the mobile device 100. The motion detector 110 outputs one or more motion signals 116 indicative of any such motion to the switching control unit 114. In at least one example, the motion detector 110 does not output the motion signal 116 if no motion of the mobile device 100 is detected. In at least one other example, the motion detector 110 outputs the motion signal 116 even if no motion is detected. That is, the motion signal 116 can indicate no motion or a particular amount of motion.

In response to the motion detector 110 detecting no motion or motion less than a predetermined motion threshold (such as less than 1 mile per hour (mph)), the switching control unit 114 refrains from switching the primary data connection mode from the WLAN primary data connection mode. For example, the predetermined motion threshold can be indicative of normal walking motion within a residence. Optionally, the predetermined motion threshold can be greater or less than 1 mph, such as 10 mph, or 0.5 mph.

As another example, the switching control unit 114 analyzes the motion, as detected by the motion detector, in conjunction with a timing signal 118 received from the timing device 112. The timing signal 118 is indicative of a time period. In at least one example, the switching control unit 114 refrains from switching from the WLAN primary data connection mode if the motion, as detected by the motion detector 110, is less than a predetermined time threshold, such as less than 30 seconds. Optionally, the predetermined time threshold can be greater or less than 30 seconds, such as 1 minute, or 10 seconds.

If, however, the switching control unit 114 determines that the mobile device 100 is moving above the predetermined motion threshold and for longer than the predetermined time threshold, the switching control unit 114 switches the primary data connection mode from the WLAN primary data connection mode (via the WLAN communication device 106) to the WWAN primary data connection mode (via the WWAN communication device 108). When the switching control unit 114 automatically switches from the WLAN primary data connection mode to the WWAN primary data connection mode, the switching control unit 114 can deactivate (for example, turn off), the WLAN communication device 106 so that the WLAN communication device 106 no longer searches for available Wi-Fi networks.

In at least one other example, when the switching control unit 114 automatically switches to the WWAN primary data connection mode, the switching control unit 114 allows the WLAN communication device 106 to remain active, but does not allow automatic connection to a Wi-Fi network. In such an example, the switching control unit 114 continues to monitor the motion of the mobile device 100 via the motion detector 110. If the motion of the mobile device 100 is below the predetermined motion threshold, the switching control unit 114 can automatically switch back to the WLAN primary data connection mode via the WLAN communication device 106. In at least one further example, the switching control unit 114 automatically switches back to the WLAN primary data connection mode in response to the motion of the mobile device 100 falling below the predetermined motion threshold for more than a predetermined time threshold, such as for longer than 1 minute. As an example, an individual having the mobile device 100 can be onboard a vehicle that is stopped at an intersection having a stop light. In order to ensure that the mobile device 100 does not automatically connect to a Wi-Fi network at or proximate the intersection, the switching control unit 114 waits at least as long as the predetermined time threshold.

In response to the switching control unit 114 detecting that motion of the mobile device 100 is less than the predetermined motion threshold for longer than the predetermined time threshold, the switching control unit 114 allows the WLAN communication device 106 to automatically connect to a Wi-Fi network in which the mobile device 100 is in range.

In at least one example, the switching control unit 114 can distinguish between different motion thresholds and time thresholds. For example, a first motion threshold can be associated with a walking speed. As an example, the first motion threshold can be 5 mph. The first motion threshold can be associated with a first time threshold, such as 2 minutes. A second motion threshold can be associated with a speed aboard a vehicle, such as a bus, automobile, train, or the like. As an example, the second motion threshold can be 20 mph. The second motion threshold can be associated with a second time threshold, such as 30 seconds. Optionally, the first motion threshold can be greater or less than 5 mph (such as 10 mph or 2 mph), the first time threshold can be greater or less than 2 minutes (such as 3 minutes or 1 minute), the second motion threshold can be greater or less than 20 mph (such as 15 mph or 40 mph), and the second time threshold can be greater or less than 30 seconds (such as 10 seconds or 50 seconds). The motion thresholds and associated time thresholds can be predetermined to account for anticipated stops during such motion, such as a pedestrian waiting for a walk signal at an intersection, a vehicle stopped at a stop light or during traffic congestion, and/or the like.

As described herein, examples of the present disclosure provide the system 101 for automatically switching between a WLAN primary data connection mode and a WWAN primary data connection mode within the mobile device 100. The system 101 includes the switching control unit 114 in communication with the WLAN communication device 106 and the WWAN communication device 108. The switching control unit is configured to selectively and automatically switch the mobile device 100 between the WLAN primary data connection mode and the WWAN primary data connection mode based on one or both of motion of the mobile device 100 or a time period of the motion of the mobile device 100.

Figure 2:
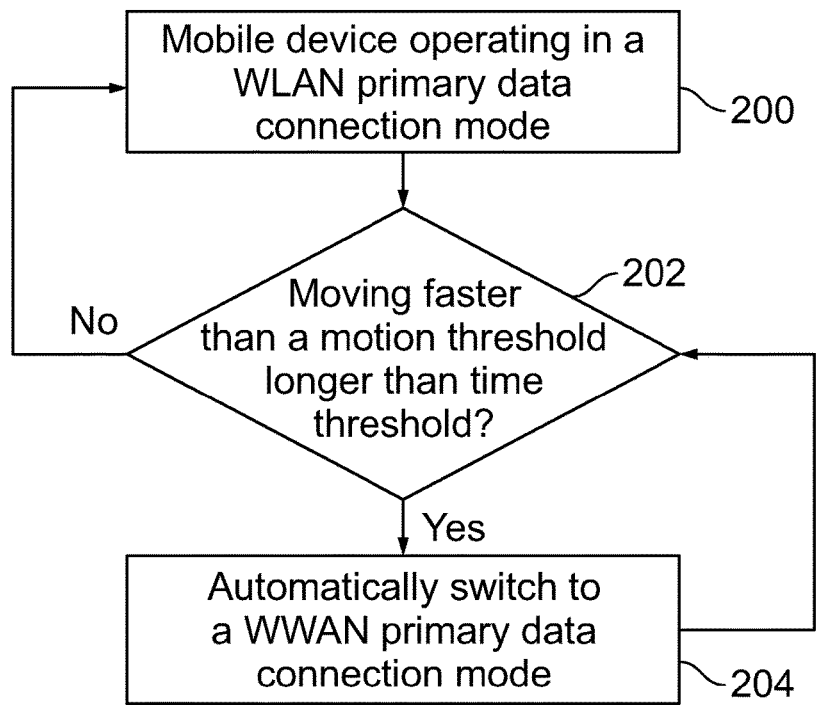
FIG. 2 illustrates a flow chart of a method for automatically switching a mobile device between different primary data connection modes, according to an example of the present disclosure.

FIG. 2 illustrates a flow chart of a method for automatically switching a mobile device between different primary data connection modes, according to an example of the present disclosure. Referring to FIGS. 1 and 2, at 200, the mobile device 100 operates in a WLAN primary data connection mode, via the WLAN communication device 106. At 202, the switching control unit 114 determines (via the motion detector 110) if the mobile device 100 is moving faster than a predetermined motion threshold for longer than a predetermined time threshold. If the mobile device 100 is not moving faster than the predetermined motion threshold for longer than the predetermined time threshold, the method returns to 200.

If, however, the switching control unit 114 determines that the mobile device 100 is moving faster than the motion threshold for longer than the time threshold, the method proceeds from 202 to 204, at which the switching control unit 114 automatically switches the mobile device 100 to the WWAN primary data connection mode via the WWAN communication device 108. The method then returns to 202. During the WWAN primary data connection mode, the switching control unit 114 can deactivate the WLAN communication device 106 or allow it to operate to search for available Wi-Fi networks (but prevent the WLAN communication device 106 from automatically connecting thereto). For example, the switching control unit 114 can deactivate the WLAN communication device 106 when the mobile device 100 is in the WWAN primary data connection mode if there is continuous data transfer with respect to the mobile device 100. If there is not a continuous data transfer, the switching control unit 114 can allow the WLAN communication device 106 to remain active to search for available Wi-Fi networks.

Optionally, the mobile device 100 can initially operate in a WWAN primary data connection mode, and then switch to operate in a WLAN primary data connection mode.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the switching control unit 114 may be or include one or more processors that are configured to control operation, as described herein.

The switching control unit 114 is configured to execute a set of instructions that are stored in one or more data storage units or elements (such as one or more memories), in order to process data. For example, the switching control unit 114 may include or be coupled to one or more memories. The data storage units may also store data or other information as desired or needed. The data storage units may be in the form of an information source or a physical memory element within a processing machine.

The set of instructions may include various commands that instruct the switching control unit 114 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the switching control unit 114. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the switching control unit 114 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 3:
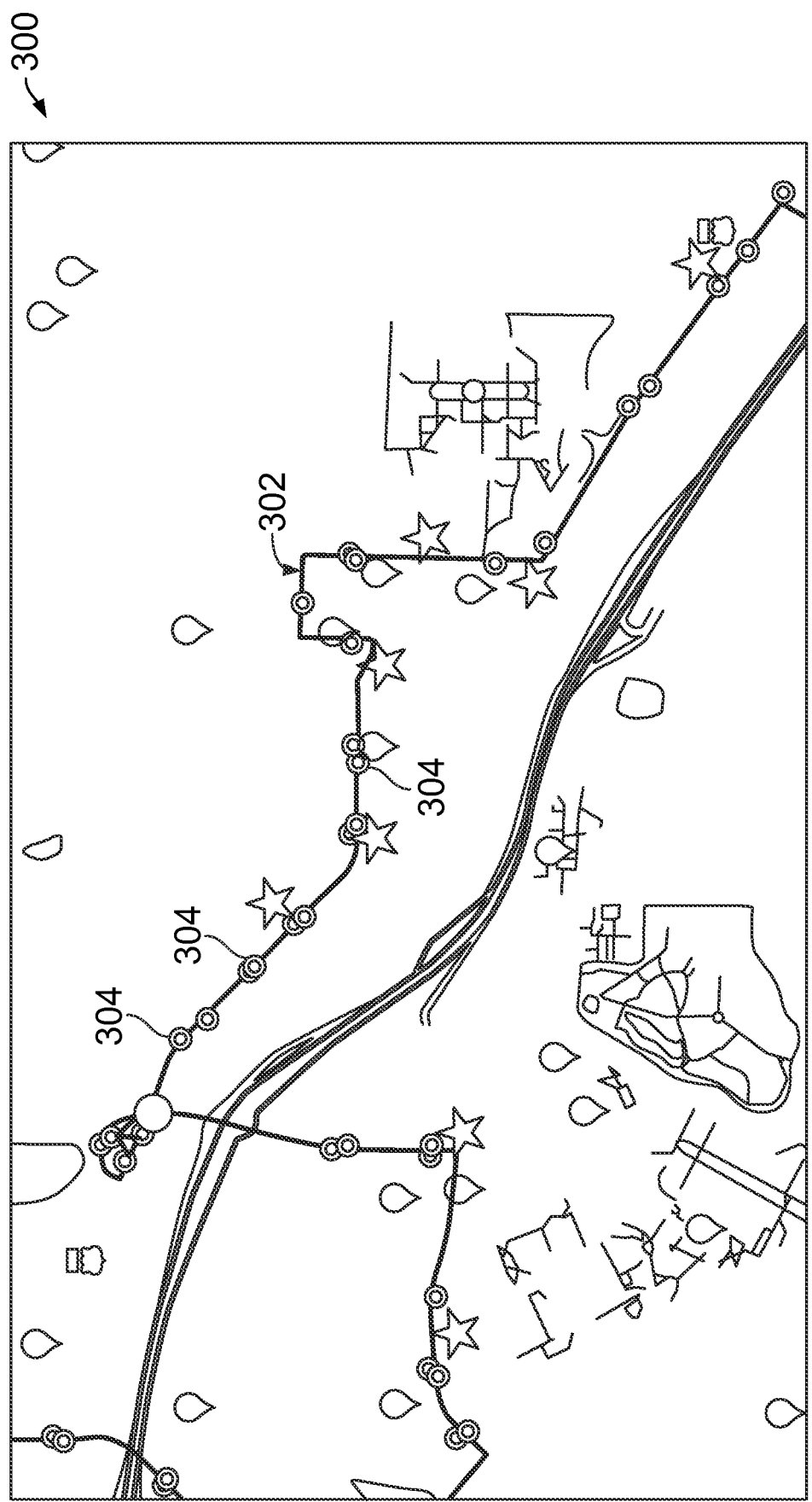
FIG. 3 illustrates a map of a route of a vehicle.

FIG. 3 illustrates a map 300 of a route 302 of a vehicle. The vehicle can be a bus, for example. The vehicle makes numerous stops 304 along the route 302. Referring to FIGS. 1-3, an individual having the mobile device 100 can be aboard the vehicle during travel along the route. The switching control unit 114 selectively and automatically switches the mobile device 100 between the W-Fi primary data connection mode and the cellular communication as the vehicle travels along the route 302, as described herein.

Further, the disclosure comprises embodiments according to the following clauses:

Clause 1: A system for automatically switching between a WLAN primary data connection mode and a WWAN primary data connection mode within a mobile device, the system comprising:
a switching control unit in communication with a WLAN communication device and a WWAN communication device,
wherein the switching control unit is configured to selectively and automatically switch the mobile device between the WLAN primary data connection mode and the WWAN primary data connection mode based on one or both of motion of the mobile device or a time period of the motion of the mobile device.

Clause 2. The system of Clause 1, wherein the switching control unit is configured to selectively and automatically switch the mobile device between the WLAN primary data connection mode and the WWAN primary data connection mode based on the motion of the mobile device and the time period of the motion of the mobile device.

Clause 3. The system of Clauses 1 or 2, wherein the mobile device is one of a smart phone, a smart tablet, a smart watch, or a laptop computer.

Clause 4. The system of any of Clauses 1-3, further comprising a housing that retains the WLAN communication device, the WWAN communication device, and the switching control unit.

Clause 5. The system of any of Clauses 1-4, further comprising a motion detector in communication with the switching control unit, wherein the motion detector is configured to detect the motion of the mobile device.

Clause 6. The system of any of Clauses 1-5, further comprising a timing device in communication with the switching control unit, wherein the timing device is configured to detect the time period of the motion of the mobile device.

Clause 7. The system of any of Clauses 1-6, wherein the switching control unit is configured to automatically switch the mobile device from the WLAN primary data connection mode to the WWAN primary data connection mode in response to the motion exceeding one or more predetermined motion thresholds for the time period exceeding one or more predetermined time thresholds.

Clause 8. The system of any of Clauses 1-7, wherein the switching control unit is configured to deactivate the WLAN communication device when the mobile device is in the WWAN primary data connection mode.

Clause 9. The system of any of Clauses 1-8, wherein the switching control unit is configured to allow the WLAN communication device to remain active when the mobile device is in the WWAN primary data connection mode.

Clause 10. A method for automatically switching between a WLAN primary data connection mode and a WWAN primary data connection mode within a mobile device, the method comprising:
selectively and automatically switching, by a switching control unit in communication with a WLAN communication device and a WWAN communication device, the mobile device between the WLAN primary data connection mode and the WWAN primary data connection mode based on one or both of motion of the mobile device or a time period of the motion of the mobile device.

Clause 11. The method of Clause 10, wherein said selectively and automatically switching comprises selectively and automatically switching the mobile device between the WLAN primary data connection mode and the WWAN primary data connection mode based on the motion of the mobile device and the time period of the motion of the mobile device.

Clause 12. The method of Clauses 10 or 11, further comprising retaining the WLAN communication device, the WWAN communication device, and the switching control unit within a housing of the mobile device.

Clause 13. The method of any of Clauses 10-12, further comprising detecting, by a motion detector in communication with the switching control unit, the motion of the mobile device.

Clause 14. The method of any of Clauses 10-13, further comprising detecting, by a timing device in communication with the switching control unit, the time period of the motion of the mobile device.

Clause 15. The method of any of Clauses 10-14, wherein said selectively and automatically switching comprises automatically switching the mobile device from the WLAN primary data connection mode to the WWAN primary data connection mode in response to the motion exceeding one or more predetermined motion thresholds for the time period exceeding one or more predetermined time thresholds.

Clause 16. The method of any of Clauses 10-15, further comprising deactivating, by the switching control unit, the WLAN communication device when the mobile device is in the WWAN primary data connection mode.

Clause 17. The method of any of Clauses 10-16, further comprising allowing, by the switching control unit, the WLAN communication device to remain active when the mobile device is in the WWAN primary data connection mode.

Clause 18. A mobile device, comprising:
 a housing;
 a WLAN communication device retained by the housing, wherein the WLAN communication device is configured to allow the mobile device to communicate with one or more Wi-Fi networks;
 a WWAN communication device retained by the housing, wherein the WWAN communication device is configured to allow the mobile device to communication with one or more cellular networks;
 a motion detector retained by the housing, wherein the motion detector is configured to detect motion of the mobile device;
 a timing device retained by the housing, wherein the timing device is configured to detect a time period of the motion of the mobile device; and
 a switching control unit retained by the housing, wherein the switching control unit is in communication with the WLAN communication device, the WWAN communication device, the motion detector, and the timing device, and
 wherein the switching control unit is configured to selectively and automatically switch the mobile device between the WLAN primary data connection mode and the WWAN primary data connection mode based on the motion of the mobile device and the time period of the motion of the mobile device.

Clause 19. The mobile device of Clause 18, wherein the mobile device is one of a smart phone, a smart tablet, a smart watch, or a laptop computer.

Clause 20. The mobile device of Clauses 18 or 19, wherein the switching control unit is configured to automatically switch the mobile device from the WLAN primary data connection mode to the WWAN primary data connection mode in response to the motion exceeding one or more predetermined motion thresholds for the time period exceeding one or more predetermined time thresholds.

As described herein, embodiments of the present disclosure provide systems and methods for consistent and reliable communication via a mobile device. Further, embodiments of the present disclosure provide systems and methods for providing consistent and reliable communication via a mobile device as an individual moves.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for automatically switching between a WLAN primary data connection mode and a WWAN primary data connection mode within a mobile device, the system comprising:
a switching control unit in communication with a WLAN communication device and a WWAN communication device,
wherein the switching control unit is configured to selectively and automatically switch the mobile device between the WLAN primary data connection mode and the WWAN primary data connection mode based on one or both of motion of the mobile device or a time period of the motion of the mobile device, and wherein the switching control unit is configured to automatically switch the mobile device from the WLAN primary data connection mode to the WWAN primary data connection mode in response to the motion exceeding one or more predetermined motion thresholds for the time period exceeding one or more predetermined time thresholds.

2. The system of claim 1, wherein the switching control unit is configured to selectively and automatically switch the mobile device between the WLAN primary data connection mode and the WWAN primary data connection mode based on the motion of the mobile device and the time period of the motion of the mobile device.

3. The system of claim 1, wherein the mobile device is one of a smart phone, a smart tablet, a smart watch, or a laptop computer.

4. The system of claim 1, further comprising a housing that retains the WLAN communication device, the WWAN communication device, and the switching control unit.

5. The system of claim 1, further comprising a motion detector in communication with the switching control unit, wherein the motion detector is configured to detect the motion of the mobile device.

6. The system of claim 1, further comprising a timing device in communication with the switching control unit, wherein the timing device is configured to detect the time period of the motion of the mobile device.

7. The system of claim 1, wherein the switching control unit is configured to deactivate the WLAN communication device when the mobile device is in the WWAN primary data connection mode.

8. The system of claim 1, wherein the switching control unit is configured to allow the WLAN communication device to remain active when the mobile device is in the WWAN primary data connection mode.

9. The system of claim 1, wherein the one or more predetermined motion thresholds are associated with walking motion.

10. A method for automatically switching between a WLAN primary data connection mode and a WWAN primary data connection mode within a mobile device, the method comprising:
selectively and automatically switching, by a switching control unit in communication with a WLAN communication device and a WWAN communication device, the mobile device between the WLAN primary data connection mode and the WWAN primary data connection mode based on one or both of motion of the mobile device or a time period of the motion of the mobile device, wherein said selectively and automatically switching comprises automatically switching the mobile device from the WLAN primary data connection mode to the WWAN primary data connection mode in response to the motion exceeding one or more predetermined motion thresholds for the time period exceeding one or more predetermined time thresholds.

11. The method of claim 10, wherein said selectively and automatically switching comprises selectively and automatically switching the mobile device between the WLAN primary data connection mode and the WWAN primary data connection mode based on the motion of the mobile device and the time period of the motion of the mobile device.

12. The method of claim 10, further comprising retaining the WLAN communication device, the WWAN communication device, and the switching control unit within a housing of the mobile device.

13. The method of claim 10, further comprising detecting, by a motion detector in communication with the switching control unit, the motion of the mobile device.

14. The method of claim 10, further comprising detecting, by a timing device in communication with the switching control unit, the time period of the motion of the mobile device.

15. The method of claim 10, further comprising deactivating, by the switching control unit, the WLAN communication device when the mobile device is in the WWAN primary data connection mode.

16. The method of claim 10, further comprising allowing, by the switching control unit, the WLAN communication device to remain active when the mobile device is in the WWAN primary data connection mode.

17. The method of claim 10, wherein the one or more predetermined motion thresholds are associated with walking motion.

18. A mobile device, comprising:
a housing;
a WLAN communication device retained by the housing, wherein the WLAN communication device is configured to allow the mobile device to communicate with one or more Wi-Fi networks;
a WWAN communication device retained by the housing, wherein the WWAN communication device is configured to allow the mobile device to communication with one or more cellular networks;
a motion detector retained by the housing, wherein the motion detector is configured to detect motion of the mobile device;
a timing device retained by the housing, wherein the timing device is configured to detect a time period of the motion of the mobile device; and
a switching control unit retained by the housing, wherein the switching control unit is in communication with the WLAN communication device, the WWAN communication device, the motion detector, and the timing device, and
wherein the switching control unit is configured to selectively and automatically switch the mobile device between the WLAN primary data connection mode and the WWAN primary data connection mode based on the motion of the mobile device and the time period of the motion of the mobile device, and wherein the switching control unit is configured to automatically switch the mobile device from the WLAN primary data connection mode to the WWAN primary data connection mode in response to the motion exceeding one or more predetermined motion thresholds for the time period exceeding one or more predetermined time thresholds.

19. The mobile device of claim 18, wherein the mobile device is one of a smart phone, a smart tablet, a smart watch, or a laptop computer.

20. The mobile device of claim 18, wherein the one or more predetermined motion thresholds are associated with walking motion.

* * * * *